United States Patent [19]
Atsumi et al.

[11] Patent Number: 5,739,520
[45] Date of Patent: Apr. 14, 1998

[54] BAR CODE READING DEVICE FOR BAR CODE VERIFIER ADAPTED TO VERIFY LONGER BAR CODE

[75] Inventors: Toru Atsumi; Yasuhiro Kamijo, both of Kariya; Yoshiki Furukawa; Naoki Matumura, both of Hadano, all of Japan

[73] Assignees: Nippon Denso Co., Ltd.; Stanley Electric Co., Ltd., both of Aichi-Ken, Japan

[21] Appl. No.: 532,002

[22] Filed: Sep. 21, 1995

[30] Foreign Application Priority Data

Sep. 22, 1994 [JP] Japan .................. 6-254631

[51] Int. Cl.⁶ ........................................ G06K 7/10
[52] U.S. Cl. ........................... 235/483; 235/472
[58] Field of Search ..................... 235/462, 472, 235/483, 485, 495; 358/473; 354/94, 294

[56] References Cited

U.S. PATENT DOCUMENTS

| | | | |
|---|---|---|---|
| 3,238,501 | 3/1966 | Mak et al. | 235/495 |
| 3,859,632 | 1/1975 | Etter | 235/495 |
| 4,319,283 | 3/1982 | Ozawa et al. | 358/401 |
| 4,521,678 | 6/1985 | Winter | 235/462 |
| 4,611,246 | 9/1986 | Nihei | 358/472 |
| 4,744,034 | 5/1988 | Milstein | 235/495 |
| 4,860,377 | 8/1989 | Ishigaki | 235/470 |
| 5,239,759 | 8/1993 | Dudek | 235/472 |
| 5,418,357 | 5/1995 | Inoue et al. | 235/470 |

FOREIGN PATENT DOCUMENTS

| | | | |
|---|---|---|---|
| 61-244168 | 10/1986 | Japan . | |
| 5-120462 | 5/1993 | Japan . | |
| 6139389 | 5/1994 | Japan . | 235/472 |
| 6-38530 | 10/1994 | Japan . | |

*Primary Examiner*—Donald T. Hajec
*Assistant Examiner*—Mark Tremblay
*Attorney, Agent, or Firm*—Louis Weinstein

[57] ABSTRACT

A scanner guide slides along a guide rail aligned with a scanning path of the scanner. A positioner with projections or holes on the guide rail cooperates with holes or projections in the guide to identify a position of the scanner within bounds equal to or less than a maximum scanning path. The scanner is swingable between a scanning position overlying a bar code and an upright non-use position displaced from the bar code scanning surface. A bar code of extended length can be precisely verified as well as a shorter bar code by the bar code reader.

15 Claims, 4 Drawing Sheets

BAR CODE READING DEVICE FOR BAR CODE VERIFIER ADAPTED TO VERIFY LONGER BAR CODE

BACKGROUND OF THE INVENTION

1. Field of the Invention

This invention generally relates to a bar code verifier for verifying whether a bar code symbol printed on a label or on the surface of an article is within a standard range or not and, more particularly, to a bar code verifier which can be applied to bar codes relatively longer than a field of effective view of a scanner of the apparatus.

2. Background Art

Referring first to FIG. 6, a bar code symbol designated as is generally comprised of a series of bars and spaces, and a relative size (i.e. length) $L$ thereof may be from 20 mm to 193 mm as is in JIS X 502. Referring to FIG. 7, a prior art optical scanner 90 capable of reading various sizes of bar codes is composed of a light source 91, a sensor element 92, and a lens 93.

In the scanning systems of the prior art, the scanner 90 also includes a slit 94, and as this slit moves along the longitudinal direction of the bar code size $L$ with constant speed, the sensor element 92 receives binary signals wherein bars 30a (black module) are represented by low level signals and the spaces 30b between the bars (white module) are high level signals.

Each binary signal is kept at a respective level according to respective width of the bars 30a and spaces 30b. The optical scanner will therefore scan the bar code pattern and generates binary signals representing the bars and spaces for transmitting to an appropriate memory device so as to determine the character represented by the bar code pattern regardless of the size $L$ of bar codes 30.

In the conventional bar code scanner described above, when the bar code scanner 90 is used as an inputting device for a bar code verifier to verify accuracy of the bar code 30, the unsteady or meandering scanning causes a reading error, e.g., in widths of the bar 30a and space 30b.

Thus, it is desirable to provide such a static scanner as an inputting device of a bar code verifier where a static image of the bar codes 30 could be stored in an image sensor, e.g., CCD, and then read out for verifying accuracy of the bar code 30. However, if such a scanner is made so that a scanner enables to read a relatively long bar code 30 in size of, e.g., 193 mm, the scanner gets large in size and it is difficult to handle and such a scanner make an erroneous reading of a relatively shorter bar code as in sizes of 20 mm.

In addition, if such a verification is carried out by providing scanners suitable to some types of bar codes having different sizes, it is necessary to provide three or four different sized scanners. In this case, although verifying accuracy may be increased, handling the scanners, which is e.g. exchanging or correcting the scanners, is complicated.

SUMMARY OF THE INVENTION

Accordingly, an object of the present invention is to provide a novel and useful bar code reading device for verifying accuracy of a bar code in which the disadvantages of the aforementioned prior art are eliminated. Another object of the present invention is to provide a bar code reading device enabling reading of a longer bar code split by a field of effective view thereof that has high accuracy. Yet another object of the present invention is to provide a reading error free bar code reading device which has high reliability.

DETAILED DESCRIPTION OF THE PREFERRED EMBODIMENTS

Figure 1:
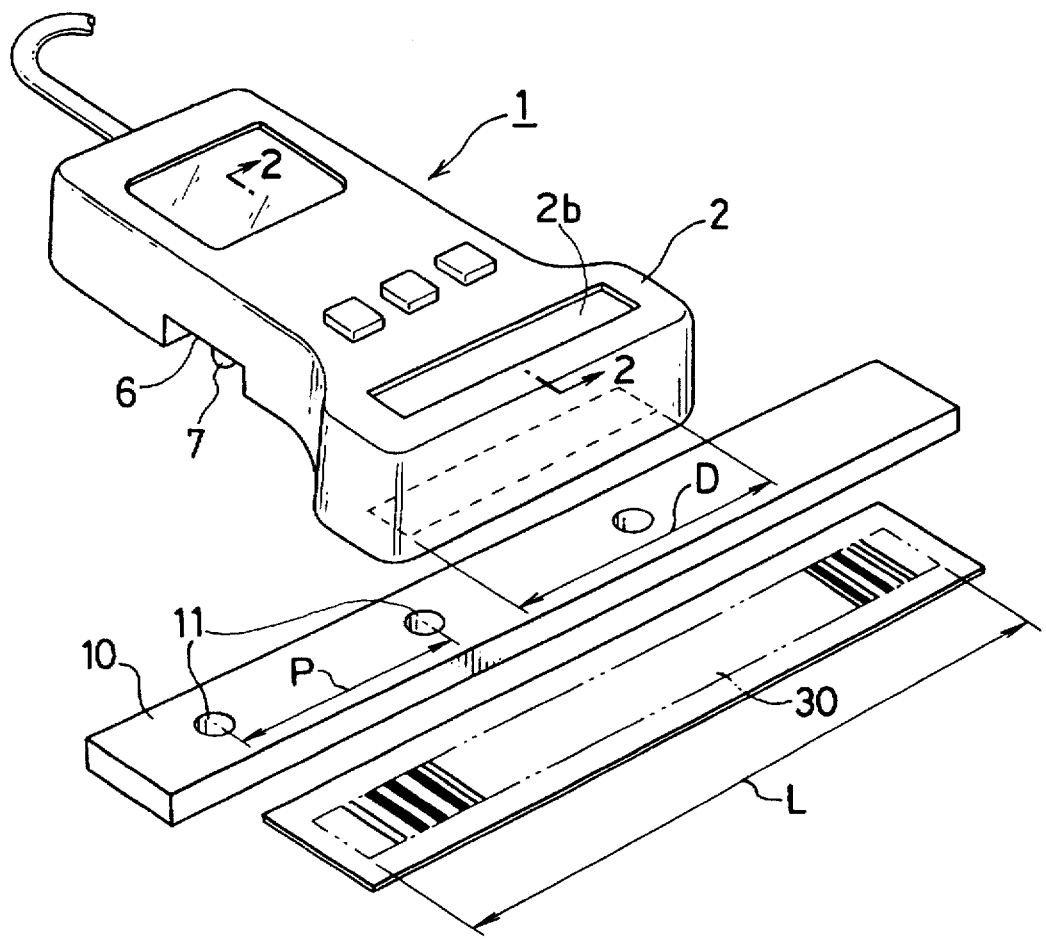
FIG. 1 is a perspective view of a bar code reading device of a bar code verifier adapted to verify accuracy of a longer bar code in a first embodiment of the present invention.
Figure 2:
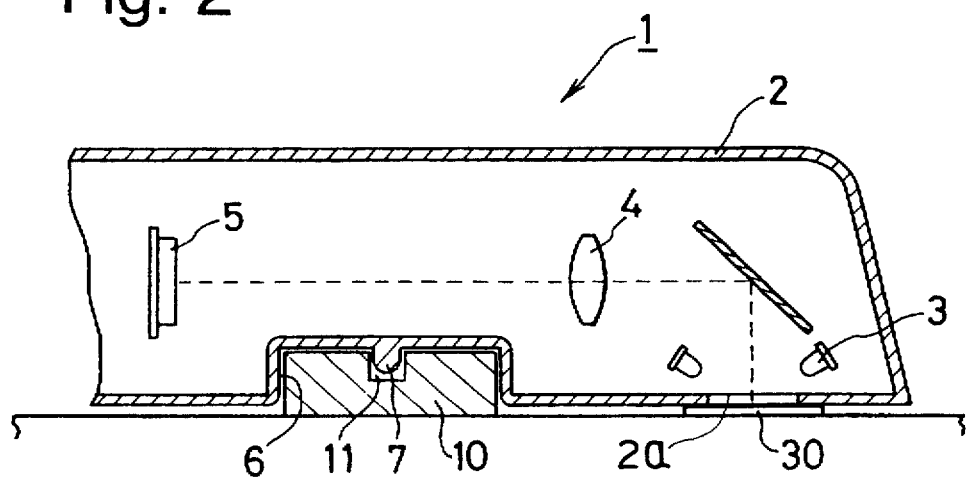
FIG. 2 shows a schematic side elevational view looking in the direction of arrows 2—2 in FIG. 1.

A first embodiment of the present invention will be described at first with reference to FIGS. 1 and 2. Referring to FIG. 1, there is illustrated a bar code scanner 1 designated as numeral 1 (hereinafter simply called as the scanner 1) for being applied to a bar code verifier according to the present invention. In a housing 2 of the scanner 1, there is provided a light source 3 such as an LED, a lens 4 and an image sensor element 5 such as a CCD on which a static image of a bar code 30 reaches through a lens 4 in order to precisely verify accuracy of a bar code 30.

It is not required that the size $\Delta$ of a reading window 2a of the housing 2 through which the shortest bar code 30 in length L can be accurately read along a scanning path is a length of 65 mm in this embodiment but the length, i.e., the minimum scanning length can be a length of 50 mm.

The housing 2 of the scanner 1 includes a longitudinal groove as a guide 6 to slide along a scanning path at the bottom thereof. Housing 2 further includes a viewing window 2b for verifying that a bar code is properly positioned in the reading window 2a.

Associated with the guide 6, there is provided a guide rail 10 fitting in the groove without shaking on which the scanner 1 is able to smoothly slide.

On the surface of the guide rail 10, a plurality of positioning holes 11 at spaces P equal to or less than the size D of the reading window that is the maximum scanning path. In addition, on the guide of the housing 2 there is provided a projection 7 fitted into the positioning hole 11.

When the space P between the positioning holes 11 is determined for the bar code 30 having the maximum length $L$, the size D of the reading window of the scanner extends across and slightly past the bar code without leaving out gaps. For example, if the bar code 30 is 193 mm in length and the size D of the reading window of the housing 2 is 50 mm, it is allowed for space P to be either 50 mm apart or 48.25 mm apart when overlapping reading is carried out.

According to the above construction of the present invention, it is possible to read a bar code longer than the size of the reading window of the scanner without missing any portion of the bar code by sequentially moving and setting the scanner 1 along the guide rail 10 on the position hole 11 and partially reading the longer bar code. In addition, it is possible to longitudinally slide the scanner 1 along a guide rail 10, i.e., the direction of a bar code length $L$. Further, the bar code 30 divided by reading is concatenated in sequence and decoded as a single code by an arithmetic circuit.

Figure 3:
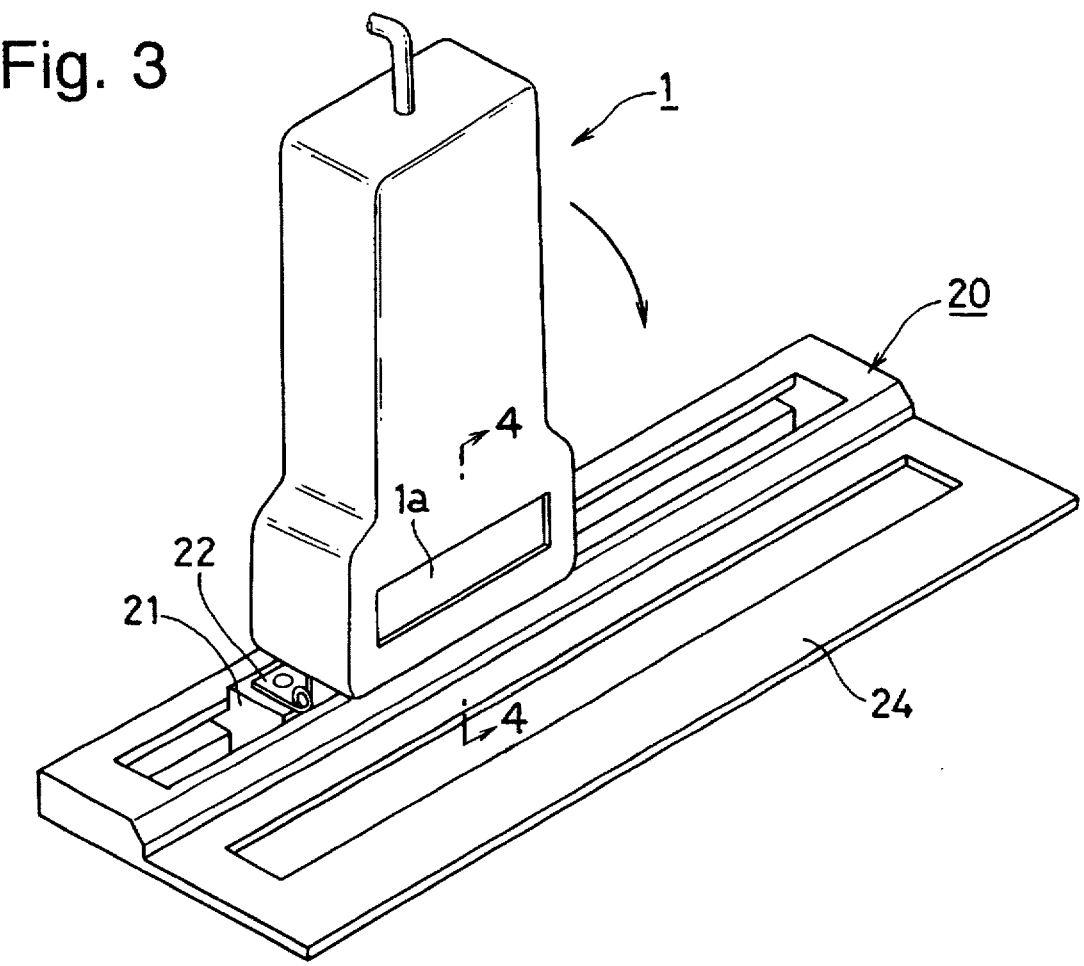
FIG. 3 is a perspective view showing a second embodiment of the present invention.
Figure 4:
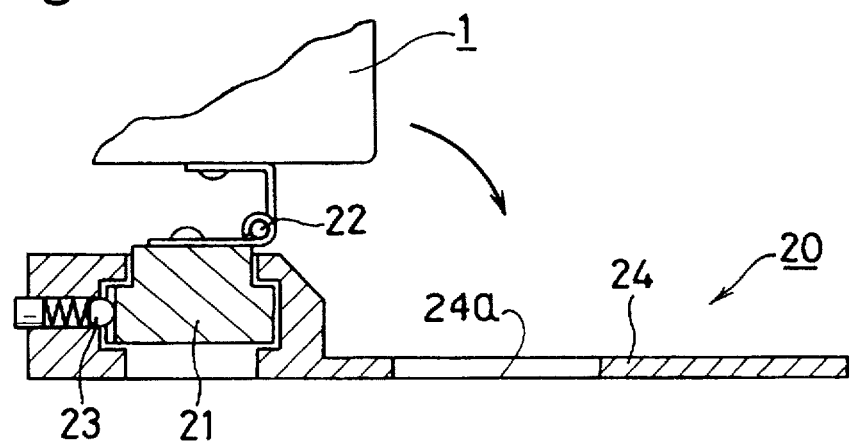
FIG. 4 shows a schematic side elevational view looking in the direction of arrows 4—4 in FIG. 3.

In the second embodiment of the present invention with reference to FIGS. 3 and 4, while the scanner 1 can be removable from the associated guide rail 10 in the first embodiment, in this embodiment it is possible to provide that a slider 21 sliding freely in a groove is integrated with a guide rail 20, moreover the slider 21 is integrated with a scanner 1 by a hinge 22 on which the scanner 1 swings between horizontal and a vertical position.

Furthermore, click stops 23 having the same spacing as that in the first embodiment reside between the guide rail 20 and the slider 21. The guide rail 20 comprises a fixing portion 24 thereof with an alignment window 24a corresponding to the reading window 1a of the scanner 1 so as to enable adjustment of a coordinate of the scanner in an upright position, and to prevent the scanner from falling down so as to stabilize in operation. The fixing portion 24 is positioned so that the bar code 30 (see FIGS. 1 and 2) can be viewed through the alignment window 24a. The scanner 1 is then swung downwardly to place the scanning window 1a over the alignment window and hence the bar code 30.

Thus, an efficient operation can be achieved by swinging the scanner 1 on the hinge 22 and whereby the fixing portion 24 of the scanner 1 makes positioning easy to read a shorter bar code 30 or by sliding the slider 21 to read a longer bar code 30.

Figure 5:
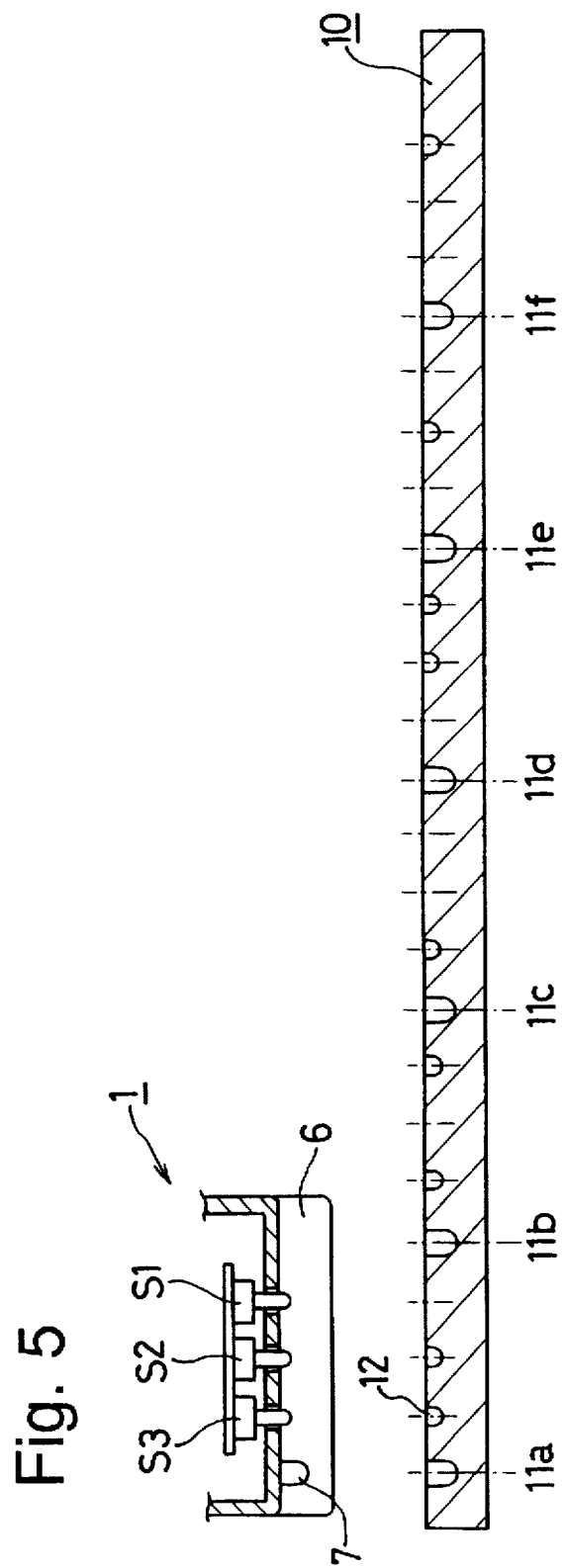
FIG. 5 illustrates a third embodiment of the present invention.
Figure 6:
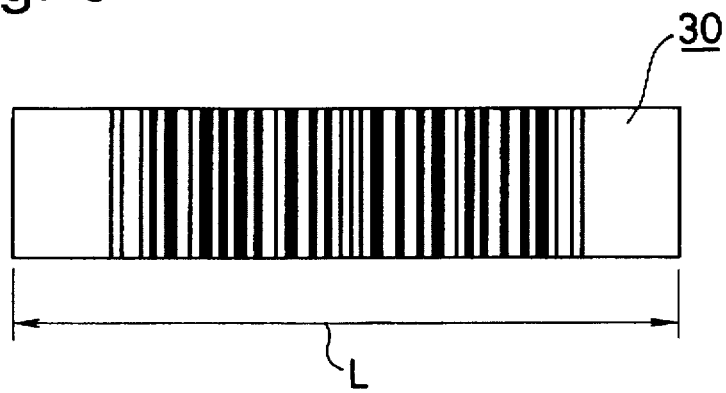
FIG. 6 depicts an illustrative bar code symbol to be verified.
Figure 7:
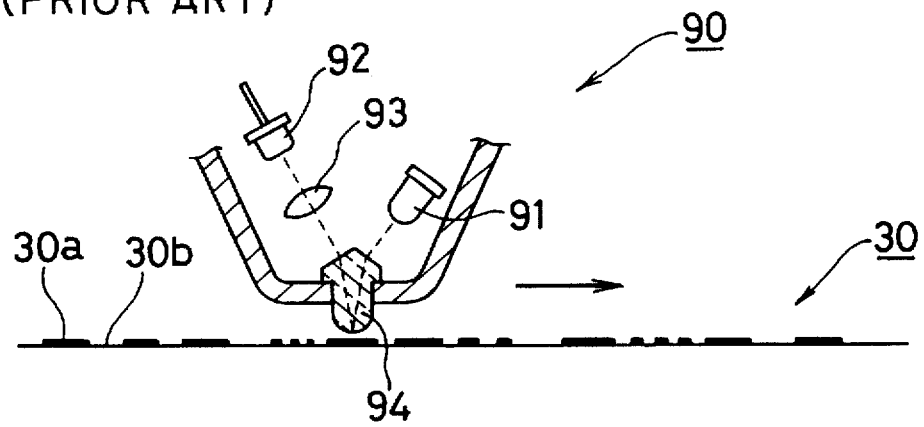
FIG. 7 is a schematic side elevational view of a conventional bar code scanner.

In the third embodiment of the present invention with reference to FIG. 5, the guide 6 of the scanner comprises a plurality of switches, e.g., S1, S2 and S3 wherein the guide 6 fits to the slider 10 turning on the switches.

In the case that the size D of the reading window of the scanner 1 is a size of the order of 35 mm, there is provided that the slider 10 has six positioning holes 11a–11f in 35 mm pitch in order to verify accuracy of the bar code 30 having a length of 193 mm.

In the preferred embodiment, when the projection 7 of the scanner 1 fits into the positioning hole 11a, dents (i.e. recesses) 12 corresponding to the switches S2 and S3 are made so as to turn on the switch S1 and off the switches S2 and S3. Therefore, the bit pattern "001" can be detected reading the output of the switches S1, S2 and S3 sequentially.

Likewise, when the projection 7 fits into the positioning hole 11b, the bit pattern "010" can be detected by turning on only the switch S2. Similarly, the bit pattern "011" at the positioning hole 11c, the bit pattern "100" at the positioning hole 11d, the bit pattern "101" at the positioning hole 11e, and the bit pattern "110" at the positioning hole 11f, thus, the outputs of the switches S1–S3 shows a user relative position where the reading has been done.

Accordingly, if a divided bar code 30 fails to be completely read, erroneous reading of the bar code 30 can be detected by, e.g., monitoring the outputs of the switches S1–S3 in a microcomputer, and even if the user accidentally distorts reading sequence corresponding to the positioning holes 11a–11f, the sequence can be reconstructed according to the corresponding outputs of the switches S1–S3.

Thus, it is possible to obtain a reading error free scanner. A scanner also comprises a plurality of switches identifying a coordinate whereon a bar code is split by means of combination of ON/OFF so as to detect partial reading or a failure of reading sequentially.

What is claimed is:

1. A bar code reading device for a bar code verifier to verify accuracy of a long bar code comprising:

a scanner having a housing, containing a light source, a lens, and an image sensor element for scanning a bar code positioned adjacent to a scanning window in said housing, and a guide aligned to a scanning path of the scanner provided along a surface of the housing and being arranged in spaced parallel fashion with said scanning window;

a guide rail fitted in said guide on which said scanner slides;

positioning means formed by a plurality of projections or holes on said guide rail, for determining a position in which said scanner slides within bounds equal to or less than a maximum scanning path;

securing means provided on the guide of the scanner cooperating with said positioning means for locating said scanner along said guide rail; and a plurality of switching elements on said guide movable to on or off positions for providing a binary code pattern when said guide is coupled to said guide rail; and means provided along said guide rail for controlling the turning-on or turning-off of said switching elements so as to detect a scanner position by a binary code pattern produced by a combination of the on and off positions of said switching elements.

2. A bar code reading device for a bar code verifier to verify accuracy of a long bar code comprising:

a scanner having a housing, for housing a light source, a lens, and an image sensor element;

said housing having an elongated scanning window;

said scanner scanning a bar code arranged adjacent to said scanning window;

a guide rail having an elongated alignment slot for aligning a bar code therebeneath;

a slider for supporting said scanner and movable along an elongated slider slot in the guide rail for moving the scanner;

said slider slot being positioned in spaced parallel fashion with said alignment slot for moving said scanning window along said alignment slot;

positioning means including a plurality of projections or holes on said guide rail, for determining a position in which said scanner slides within bounds equal to or less than a maximum scanning path; and securing means provided on the slider and cooperating with said positioning means for locating said scanner along said guide rail.

3. A bar code reading device according to claim 2, wherein one of said securing means and positioning means comprises click-stop means.

4. A bar code reading device for a bar code verifier to verify accuracy of a long bar code comprising:

a scanner having a housing, for housing a light source, a lens, and an image sensor element for scanning a bar code positioned adjacent to a scanning window in said housing, and a guide aligned to a scanning path of the scanner provided along a surface of the housing and being arranged in spaced parallel fashion with said scanning window;

a guide rail fitted in said guide along which said scanner slides;

positioning means formed by a plurality of projections or holes on said guide rail, for determining a position in which said scanner slides within bounds equal to or less than a maximum scanning path;

securing means provided on the guide of the scanner cooperating with said positioning means for locating said scanner along said guide rail;

said housing being provided with an elongated reading opening; and said guide comprising a recess in said housing having side walls slidably engaging associated side walls of said guide rail whereby the guide is arranged to move the housing along a path substantially parallel to a longitudinal axis of said reading opening.

5. A bar code reading device according to claim 4, wherein said positioning means are arranged along a base surface of said recess so that said positioning means are adjacent to and above a top surface of said slider along which said securing means are provided.

6. A bar code reading device for a bar code verifier adapted to verify accuracy of a long bar code comprising:

a scanner having a housing for housing a light source, a lens and an image sensor element;

said housing having an elongated reading opening;

said scanner scanning a bar code aligned with said scanning window;

a support member having an elongated slot serving as an alignment window which is positionable over a surface having a bar code;

said support member having an elongated guide track and a scanner mounting member slidable along said elongated guide track, said guide track confining said scanner mounting member to movement along a linear path substantially parallel to and a spaced distance from a longitudinal axis of said alignment window; and means for mounting said scanner housing to said scanner mounting member for reading a bar code positioned beneath said elongated alignment window when said reading opening is aligned with said alignment window.

7. A bar code reading device according to claim 6, further comprising;

means for swingably mounting said housing to said scanner mounting member to enable said scanner to move between an upright position and a reading position, said reading position placing said reading opening immediately above said alignment window; and said upright position displacing the scanner housing reading opening from said alignment window to facilitate alignment thereof along a surface having a bar code preparatory to reading the bar code.

8. A bar code reading device according to claim 1, wherein one of said securing means and positioning means comprises click-stop means.

9. A bar code reading device for a bar code verifier according to claim 1, wherein said switching elements on said guide are comprised of resiliently mounted activating projections and said means provided along said guide rail comprise activating means for selectively engaging said resiliently mounted projections such that each switching element is in a first switch condition when its resiliently mounted projection engages an activating means and is in a second position when said resiliently mounted projections are displaced from said activating means.

10. The bar code reading device of claim 9 wherein said activating means are projections along said guide rail.

11. The bar code reading device of claim 9 wherein said activating means are recesses along said guide rail.

12. A bar code reading device according to claim 11, wherein the recesses in said guide rail are arranged to cause said switches to generate a multi-bit binary code, each code identifying a particular position of the housing along the guide rail, and each code being different from every other code.

13. The bar code device of claim 12, wherein said recesses are arranged to provide at least a two bit binary code.

14. The bar code device of claim 13, wherein said recesses are arranged to provide at least a three bit binary code.

15. A bar code reading device according to claim 7 wherein said guide track comprises a second elongated slot for slidably receiving said scanner mounting member which second elongated slot lies substantially in a common plane with the first-mentioned alignment window.

* * * * *